Sept. 20, 1966 P. H. LEGARRA ETAL 3,273,918
SEALED COUPLING
Filed April 20, 1964 3 Sheets-Sheet 1

INVENTORS
PHILIP H. LEGARRA
ELTON C. HALLETT
BY

ATTORNEYS

Sept. 20, 1966                P. H. LEGARRA ETAL                3,273,918
                                SEALED COUPLING
Filed April 20, 1964                                        3 Sheets-Sheet 2

INVENTORS
PHILIP H. LEGARRA
ELTON C. HALLETT
BY

ATTORNEYS

Sept. 20, 1966   P. H. LEGARRA ETAL   3,273,918
SEALED COUPLING

Filed April 20, 1964   3 Sheets-Sheet 3

INVENTORS
PHILIP H. LEGARRA
ELTON C. HALLETT
BY

ATTORNEYS

United States Patent Office 3,273,918
Patented Sept. 20, 1966

3,273,918
SEALED COUPLING
Philip H. Legarra, 1701 Sepulveda Blvd., Manhattan Beach, Calif., and Elton C. Hallett, 2021 Sabrina Terrace, Corona Del Mar, Calif.
Filed Apr. 20, 1964, Ser. No. 360,915
13 Claims. (Cl. 285—332.3)

This invention pertains to a coupling for joining together tubular fluid-conducting members.

For the connection of tubular conduits to conduct fluid, AN fittings have been used extensively for many years. These fittings meet certain government specifications, and have proved satisfactory for a number of purposes. However, AN fittings originally were designed only for low pressure systems, such as fuel systems. Gradually, however, operating conditions have become more severe, and these fittings have been called upon to withstand conditions far beyond those originally contemplated. Variations in temperatures encountered have become enormous, ranging from very low temperatures to extremely elevated temperatures. Likewise, pressures in the systems have risen greatly. Moreover, the fluids to be conducted often have become more difficult to handle, and may be, for example, rare gases or toxic or corrosive fluids. Also, the plumbing systems in which the fittings are incorporated may be subjected to high G loads or severe vibrational conditions. As a consequence of such factors, conventional AN fittings no longer are dependable for many uses. Leakage frequently occurs where sections of tubing are joined together.

Present criteria necessitate systems made entirely of metal and capable of performing under extreme conditions. Complete reliability is essential, while flexibility and ease of use likewise are of prime importance. The present invention provides a fitting enabling systems to be assembled which will conform to all such standards.

The design of this invention utilizes a metal bellows-type seal, recessed within the fitting to avoid any flow restriction of the fluid passing therethrough. It includes a solid nose portion having a tapered surface that incorporates a sealing bead. This fits within a recess in the fitting so that there is a positive bottoming when the fitting is fully tightened, giving strength and rigidity to the assembled unit. An annular bead likewise provides a seal at the opposite end of the bellows unit. Fluid forces within the fitting tend to urge the sealing surfaces into firm engagement so that, even if the securing nut should become loosened, the seal may be retained. Also, the spring-effect of the compressed bellows element forces the sealing surfaces into contact and further lessens the possibility of the seal's being broken.

An object of this invention is to provide a sealed coupling arrangement of great reliability, capable of operating through a wide range of conditions.

Another object of this invention is to provide a sealed coupling of strength and rigidity, yet which is simple to use and adaptable to various circumstances.

A further object of this invention is to provide a sealed coupling design suitable for containing a variety of fluids, including gases and liquids that may be corrosive or toxic.

A still further object of this invention is to provide a sealed coupling design capable of withstanding high acceleration forces or vibrational loads while maintaining a fluid-tight condition.

An additional object of this invention is to provide a sealed coupling which does not penalize performance by creating an added pressure drop.

Yet another object of this invention is to provide a sealed coupling which is capable of maintaining a sealed connection even under conditions where the attaching element is not firmly secured.

These and other objects will become apparent from the following detailed description taken in connection with the accompanying drawing in which.

Figures 1, 2:
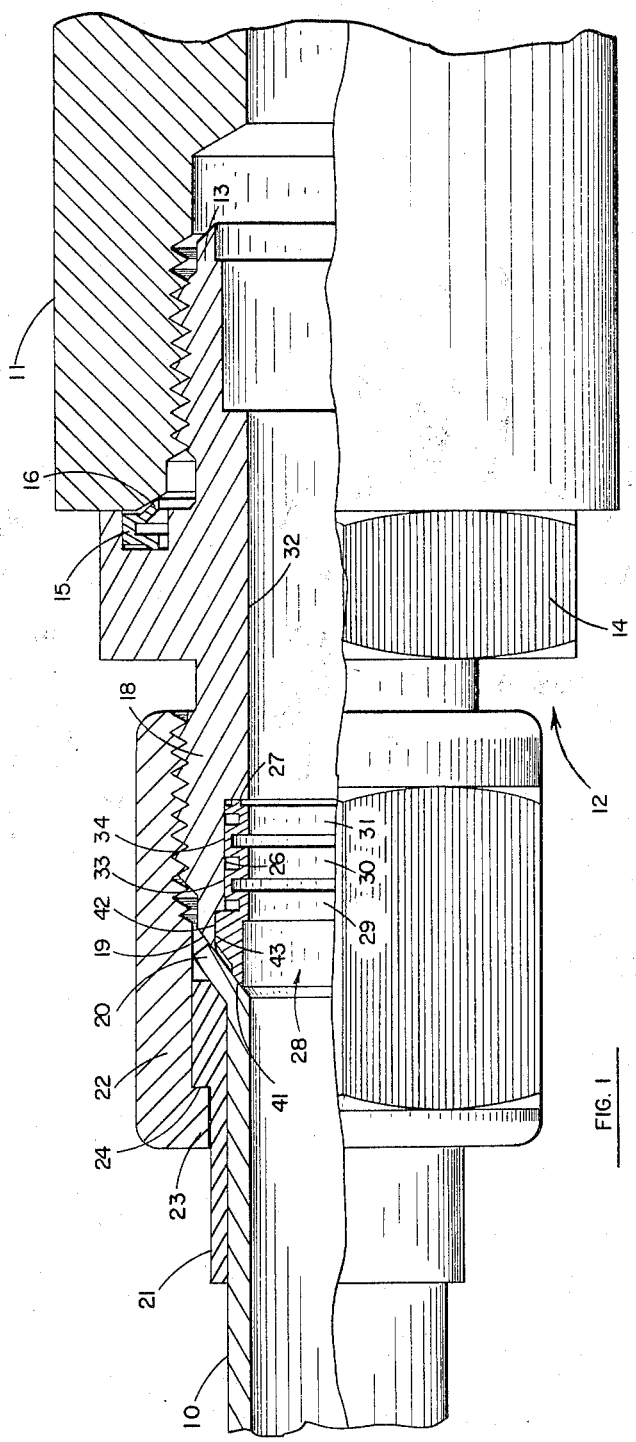
FIGURE 1 is a longitudinal sectional view, partially in elevation, illustrating the sealed coupling of this invention.
FIGURE 2 is an enlarged fragmentary sectional view of the portion where the solid nose of the bellows cooperates with the other elements of the fitting to form a stop and a seal.
Figure 3:
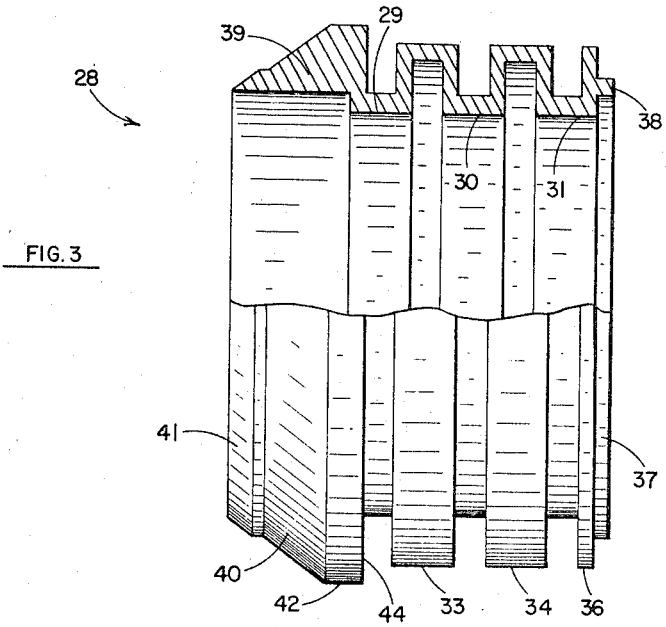
FIGURE 3 is a longitudinal sectional view, partially in elevation, of the bellows removed from the other components.

With reference to FIGURES 1, 2 and 3, the arrangement of this invention may be seen as utilized in attaching a tube 10 to an adjoining device such as a valve body 11. The fitting 12, which interconnects the tube 10 and the body 11, includes an exteriorly threaded inner end 13 received in an opening in the body 11. The fitting 12 is rotated into the valve body 11 by means of hexagonal portion 14, the forward face of which is recessed to receive an annular metal seal 15. The latter element includes a lip 16 contacting the valve body to block outward flow of fluid and thus prevent leakage through the threaded connection of the fitting to the valve body.

Beyond the hexagonal portion 14 the fitting 12 includes a threaded section 18 and a beveled end wall 19. The latter surface is contacted by the flared end 20 of the tube 10, which is inclined at the same angle as the end wall 19, and is held against the end wall by a sleeve 21. Nut 22 receives the threaded portion 18 of the fitting and includes an inwardly extending lip 23 bearing against shoulder 24 on the sleeve 21 so that the sleeve 21 forces the flared end 20 of the tube 10 inwardly against the end wall 19 of the fitting 12.

The outer end portion of the fitting 12 is recessed to define a circumferential wall 26, and a radially inwardly extending shoulder 27 at the inner end of the circumferential wall portion 26. Within this recessed area, and interposed between the shoulder 27 and the flared tube end 20, is a bellows seal 28 normally of metal. Preferably, the portions 29, 30 and 31 of smallest interior diameter of the bellows seal 28 are at least as large in internal diameter as the bore 32 through the fitting 12. Hence, the bellows seal does not provide a flow restriction to create a pressure drop through the fitting.

With reference to the enlarged illustrations of FIGURES 2 and 3, the inner portions 29, 30 and 31 of the undulant part of the seal 28 are constructed as short cylindrical sections. Substantially radial walls connect these inner portions to the outer sections 33, 34 and 35, which likewise are of cylindrical contour. Hence, the peripheries of the portions 33, 34 and 35 can lie closely against the cylindrical recessed portion 26 of the fitting 12. As many undulations may be provided as desired to provide a seal of appropriate length and flexibility.

The radial inner end wall portion 36 of the bellows includes an axially projecting sealing bead 37. The latter element has a flat outer radial face 38 which is relatively narrow in width, thereby concentrating the forces which urge it against the shoulder 27 of the fitting.

The opposite end of the bellows includes a solid block of material 39 having a beveled surface 40 tapering radially inwardly and axially outwardly with respect to the axis of the bellows. At the inner periphery of the block 39 is an annular sealing element 41, which is beveled similarly to the surface 40. The surface of the sealing element 41 has the same angle as the surface 19 of the fitting, and is spaced radially inward of that surface. It should be noted that the end portion 39 is outwardly set with respect to the inner undulating part of the bellows so that the circumferential periphery 42 of the end portion 39 is spaced radially beyond the corresponding sections 33, 34 and 35 of the bellows.

The outer end of the fitting 12 includes an additional recess adjacent the end wall 19, having a cylindrical surface 43, which is outwardly of the adjoining surface 26 of the recessed end. The end section 39 of the bellows fits within the recess adjacent the end surface 19 with the peripheral area 42 adjacent and substantially complementary to the cylindrical surface 43 of the recess. This brings radial shoulder 44, located at the inner edge of the end block 39, into contact with the radial abutment shoulder 45 which is located at the inner end of circumferential surface 43 of the fitting.

When the nut 22 is tightened onto the fitting 12 the lip 23 of the nut forces the sleeve 21 inwardly, as described above, so that the flared tube end 20 is brought into engagement with the beveled end 19 of the fitting. At the same time, this forces the flared tube end into contact with the narrow annular sealing bead 41 of the bellows. Consequently, there is an axial compression force on the bellows, resulting in the creation of a seal both at the bead 41 and at the bead 37 at the opposite end of the bellows. Hence, the flared tube end does not have to seal against a flared surface at the fitting, but instead creates a seal at the point of contact with the internally carried bellows 28. The narrow annular sealing beads 37 and 41 concentrate the axial forces in relatively small areas so that pressures are high. Therefore, a more secure seal is obtained than where there are large flat surfaces in engagement as in a conventional flared tube connection.

Internal pressures within the fitting tend to expand the bellows 28 and to force the beveled bead 41 more tightly into contact with the flared end 20 of the tube, and the bead 37 against shoulder 27. Thus, the pressure within the fitting works to make the seal more effective, rather than tending to destroy the seal as in conventional designs. Even in the event that the nut 22 should become loosened so that it no longer forces the sleeve 21 tightly against the flared end 20 of the tube, the fluid forces, nevertheless, by tending to expand the bellows, will help maintain the seal at either end of the bellows. Moreover, the bellows 28 possesses a resilience, so that when compressed into the fitting it exerts an axial outward force to help maintain the beads 37 and 41 in the contact with their adjacent surfaces. Therefore, the seal will not readily be lost, but will continue to prevent egress of fluid at the connection of the flared tube end to the fitting even under the most extreme conditions, including situations where the attaching nut is loose.

One of the principal advantages of the construction of this invention lies in the arrangement of the end block 39 with respect to the other fitting components. This portion of the bellows acts as a stop for the connection of a tube to the fitting, preserving the bellows and adding strength and rigidity to the joint. The spacing between the shoulder 44 of the end portion and the annular bead 41 is correlated with the fitting dimensions so that, when the nut 22 is fully tightened, the flared tube end will be stopped by the rigid end section 39. The dimensions are such that, when the fitting is bottomed during the connection, the beveled edge 41 of the bellows 28 is aligned with the beveled surface 19 of the fitting. Hence, the bellows limits the inward travel of the flared tube end because it is solid and will not deflect between surfaces 41 and 44 of the bellows end. The surface 44 transmits the forces from the tube end to the shoulder 45 of the fitting so that there is a firm attachment to the fitting and a rigidity of the connection. This resulting rigidity gives invaluable strength where the plumbing system may be poorly supported. This is of especial importance under high G loads. Moreover, where vibrations are encountered, or where other forces may be applied to the plumbing system, the use of the solid end block with the positive bottoming assures maintenance of the seal at the fitting. An added and no less important advantage of the mechanical stop provided by the solid nose 39 is that the bellows is fully protected from damage by overtightening. No matter what torque may be applied to the nut 22, the parts can be advanced axially only a predetermined amount. Hence, the bellows cannot be distorted, overcompressed or otherwise damaged.

Figure 5:
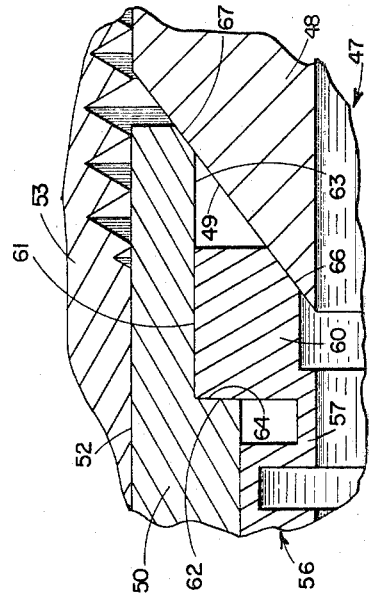
FIGURE 5 is an enlarged fragmentary sectional view of the nose portion of the bellows and associated elements.
Figure 4:
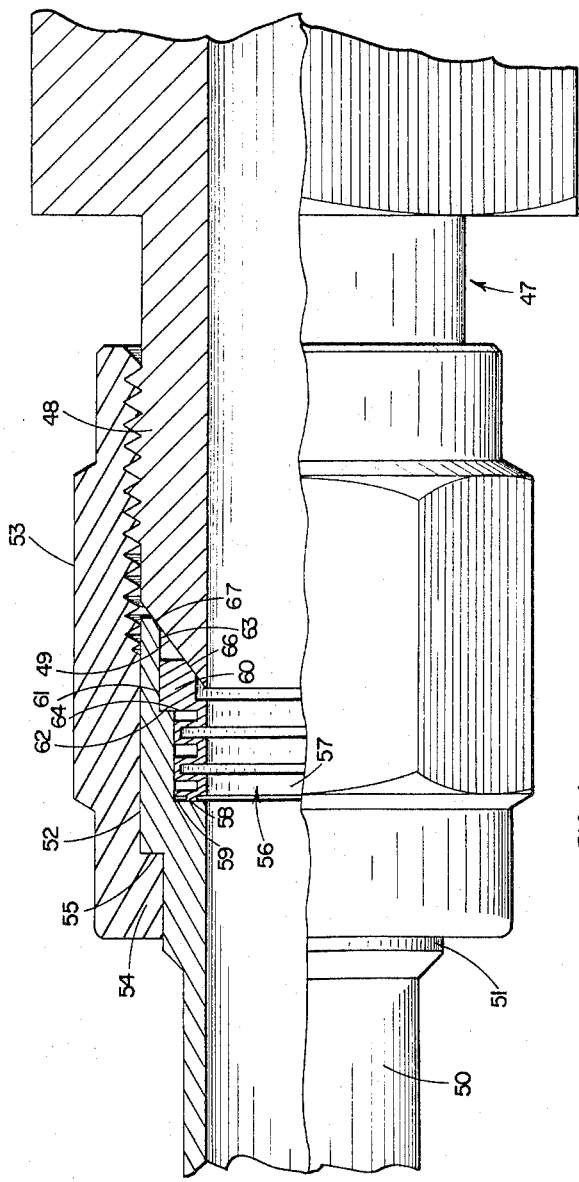
FIGURE 4 is a view similar to FIGURE 1, but of a modification providing a female seal.
Figure 6:
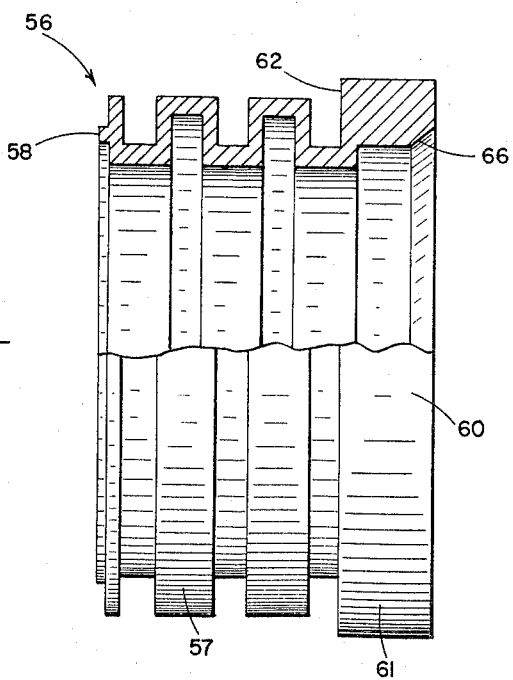
FIGURE 6 is a longitudinal sectional view, partially in elevation, of the bellows unit of FIGURE 4 separated from the other components.

The invention as described above pertains to an internal seal reacting against an exteriorly arranged flared surface. However, the seal can be designed also to be in effect a female element, sealing against the outside of the fitting surface. This type of construction may be seen by reference to FIGURES 4, 5 and 6. Here there may be seen a fitting 47 having an externally threaded end portion 48 terminating in a beveled end surface 49. It may be desired to connect a member 50 to the fitting 47, and the member 50 may constitute a tube or other fluid-transmitting element. The member 50 includes a short cylindrical portion 51, smaller in outside diameter than adjoining cylindrical section 52. A nut 53 circumscribes the portions 51 and 52 and engages the thread on end portion 48 of the fitting 47. The nut 53 is generally similar to the nut 22, including an inwardly extending flange portion 54 that contacts the shoulder 55 between the sections 51 and 52 of the element 50. Consequently, when the nut 53 is tightened the flange 54, by engaging the shoulder 55, urges the member 50 toward the fitting 47.

Interiorly of the cylindrical portion 52, the member 50 is recessed to receive a bellows unit 56. The inner end portion of this bellows is similar to the corresponding portion of the bellows 28. Hence, it has undulating portions 57 with cylindrical inner and outer peripheries, and radial interconnecting walls. Likewise, at the inner end of the bellows 56 is an annular bead 58, which engages a radial shoulder 59 at the end of the recess in the section 52. The annular bead 58 provides a seal at the shoulder 59 to prevent leakage around the inner end of the bellows.

The outer end of the bellows 56 includes a solid nose 60, having a larger cylindrical outer diameter 61 than the corresponding portions of the undulating section 57 of the bellows. Radial wall 62 extends inwardly from the inner end of the cylindrical surface 61. The section 61 is received complementarily within the enlarged cylindrical area 63 of the recess in the member 50, with surface 62 of the bellows being brought into contact with a radial shoulder 64 at the inner end of the cylindrical portion 63.

The end element 60 includes inwardly inclined beveled surface 66 at the inside corner of its outer end. This is beveled to the same angle as the surface 49, and as the inside corner 67 of the outer end of the section 52 of the member 50.

As a result, when the nut 53 is tightened, the effect is subtsantially the same as with the previously described embodiment. Tightening of the nut urges the member 50 inwardly to the position where its beveled surface 67 engages the beveled surface 49 of the fitting 47. Similarly, the beveled surface 66 of the bellows engages the inner part of the beveled surface 49 of the fitting, forming a seal at this location. The bellows becomes compressed by the relative movement between the members 40 and 47 so that both ends of the bellows become sealed. The solid nose 60 of the bellows cooperates with the shoulder 61 to limit the axial movement and protect the bellows from distortion. Again, upon full tightening the end portion of the bellows provides a solid bottoming surface so that a strong rigid connection is achieved. The joint is fully supported internally so that it will resist forces applied to it without breaking the seal. At the same time, the seal does not obstruct the flow through the fitting so that there is no penalty incurred from pressure loss. Moreover, the fitting and seal are of relatively simple construction, readily manufactured and used.

In both versions the invention is of universal applicability, being adaptable for connecting tubes or other elements that transmit fluid. The arrangement can be made entirely of metal, and need not rely upon elastomeric seals. Consequently, its temperature tolerances are great, and it will operate satisfactorily through extreme ranges. The positive seal will retain either gases or liquids, and it can be manufactured from materials that will withstand corrosive fluids.

The foregoing detailed description is to be clearly understood as given by way of illustration and example only, the spirit and scope of this invention being limited solely by the appended claims.

What is claimed is:
1. A sealed coupling arrangement comprising
   a first member to be connected,
   a second member to be connected,
      said members having bores therein
         and having interengaging surfaces for interconnecting said bores,
   an axially compressible sealing member,
      said sealing member having a first surface sealingly engaging said first member adjacent the bore thereof and a second surface sealingly engaging said second member adjacent the bore of said second member,
   said first member including an abutment
      said sealing member engaging said abutment inwardly of said second surface thereof,
      and being relatively rigid between said second surface and said abutment for acting as a stop upon said interengagement of said first and second members, and means holding said first and second members together, with the movement of said first and second members toward each other limited by said engagement of said second surface of said sealing member and said abutment of said first member.

2. An arrangement for providing a sealed joint comprising
   a first member to be joined,
      said first member having a bore therethrough and a recess at one end of said bore,
         said recess defining a first shoulder at the inner end thereof
         and a second shoulder intermediate said inner end of said recess and the outer end thereof,
      said one end of said first member having a beveled surface outwardly of said recess,
   a second member to be joined,
      said second member having a beveled surface engaging said beveled surface of said first member,
   a bellows,
   said bellows having one end sealingly engaging said first shoulder,
   a beveled outer end surface sealingly engaging said beveled surface of said second member to to be joined,
   and a shoulder intermediate said ends engaging said second shoulder of said first member to be joined,
      said bellows being realtively rigid between said beveled outer end of said bellows and said shoulder of said bellows for providing a rigid stop for limiting the relative advancement toward each other of said first and second members, and means urging said first and second members toward each other into interengagement.

3. A sealed coupling arrangement comprising
   a first member having a bore,
   a second member having a bore,
      said first and second members having interengageable portions for interconnecting said bores,
      said first member being annularly recessed at said portion to provide
         a first inner shoulder
         and a second shoulder axially outward of said first shoulder,
      said first member having a beveled surface at the exterior of said portion,
         said second member having a beveled surface interengageable with said beveled surface of said first member,
   a bellows sealing member in said recess in said first member, said bellows having a first end sealingly engaging said first shoulder,
      and an opposite end having a beveled surface sealingly engaging said beveled surface of said second member,
      said bellows further having a shoulder engaging said second shoulder of said first member,
         and being relatively rigid between said opposite end and said shoulder of said bellows for providing a positive stop for said second member when said second member so engages said first member,
   and means for urging said first and second members into said interengagement.

4. A device as recited in claim 3 in which
   said beveled surface of said bellows is aligned with and at substantially the same angle as said beveled surface of said first member.

5. A device as recited in claim 3 in which
   said bellows includes an undulating portion intermediate said shoulder of said bellows and said opposite end thereof,
      said undulating portion being at least as great in internal diameter as the diameter of said bore.

6. A sealed coupling arrangement comprising
   a first member having a bore,
   a second member having a bore,
      said first and second members having beveled outer ends interengageable to interconnect said bores,
      said first member having a first annular recess adjacent said outer end thereof
      and a second annular recess inwardly of said first annular recess,
         said second annular recess being of smaller diameter than said first annular recess
         and of greater diameter than the diameter of said bore,
            whereby there is defined a shoulder between said first and second recesses and a shoulder between said second recess and said bore,
   a bellows seal,
      said bellows having an undulating axially compressible portion in said second recess
         with one end of said bellows sealingly engaging said shoulder between said second recess and said bore,
      said bellows having a solid end portion in said first recess,
         said solid end portion having a shoulder engaging said shoulder between said first and second recesses, and having a beveled outer surface sealingly engaging said beveled end of said second member
            for providing a seal with said second member and an axial stop for limiting the movement of said second member toward said first member, and means urging said first and second members into said interengagement.

7. A device as recited in claim 6 in which said solid end portion of said bellows has an outside diameter substantially complementary to the diameter of said first annular recess.

8. A device as recited in claim 6 in which said undulating portion of said bellows is at least as great in internal diameter as the diameter of said bore.

9. A device as recited in claim 6 in which said beveled surface of said bellows is aligned with and at substantially the same angle as said beveled surface of said first member.

10. A device as recited in claim 6 in which said beveled outer end of said second member flares outwardly and said beveled outer end of said first member and said beveled surface of said seal are inclined axially outwardly and radially inwardly, said beveled surface of said seal presenting a relatively narrow area of contact with said beveled end of said second member for concentrating forces between said second member and said seal.

11. A device as recited in claim 6 in which said beveled end of said second member is inclined axially outward and radially inward, and said beveled end of said first member and said beveled surface of said bellows are inclined axially and radially inward.

12. A device as recited in claim 6 in which said beveled surface of said bellows and said beveled end of said first member are in spaced relationship, with said beveled surface of said bellows being radially inwardly of said beveled end surface of said first member.

13. A device as recited in claim 12 in which said bellows includes relatively narrow annular portions at said one end and at said beveled outer end for engaging said first shoulder and said beveled end of said second member for thereby concentrating axial forces therebetween and providing a fluid-tight seal.

References Cited by the Examiner

UNITED STATES PATENTS

| | | | |
|---|---|---|---|
| 867,752 | 10/1907 | Phillips | 285—99 |
| 1,889,868 | 12/1932 | Montgomery | 285—375 X |
| 2,522,785 | 9/1950 | Hanson | 285—382.7 X |
| 2,789,843 | 4/1957 | Bily | 285—109 X |
| 2,862,729 | 12/1958 | Bredtschneider | 285—226 X |

FOREIGN PATENTS 686,387   1/1953   Great Britain.

CARL W. TOMLIN, *Primary Examiner.*

D. W. AROLA, *Assistant Examiner.*